(12) United States Patent
Young (10) Patent No.: US 8,504,766 B2
(45) Date of Patent: Aug. 6, 2013

(54) METHODS AND APPARATUS FOR CUT-THROUGH CACHE MANAGEMENT FOR A MIRRORED VIRTUAL VOLUME OF A VIRTUALIZED STORAGE SYSTEM

(75) Inventor: Howard Young, Thousand Oaks, CA (US)

(73) Assignee: Netapp, Inc., Sunnyvale, CA (US)

( * ) Notice: Subject to any disclaimer, the term of this patent is extended or adjusted under 35 U.S.C. 154(b) by 613 days.

(21) Appl. No.: 12/761,270

(22) Filed: Apr. 15, 2010

(65) Prior Publication Data
US 2011/0258376 A1    Oct. 20, 2011

(51) Int. Cl.
*G06F 12/00* (2006.01)
*G06F 13/00* (2006.01)
*G06F 13/28* (2006.01)

(52) U.S. Cl.
USPC ............................. 711/113; 711/142; 711/114

(58) Field of Classification Search
USPC ......................................... 711/113, 142, 130
See application file for complete search history.

(56) References Cited

U.S. PATENT DOCUMENTS

| | | | | |
|---|---|---|---|---|
| 6,880,040 B2* | 4/2005 | Basham et al. | ............... | 711/111 |
| 6,880,062 B1* | 4/2005 | Ibrahim et al. | ................ | 711/202 |
| 7,127,549 B2* | 10/2006 | Sinclair | ......................... | 711/100 |
| 7,827,251 B2* | 11/2010 | Kamisetty et al. | ............ | 709/213 |
| 8,046,548 B1* | 10/2011 | Chatterjee et al. | ............ | 711/162 |
| 2005/0262309 A1* | 11/2005 | Frey et al. | ..................... | 711/141 |

* cited by examiner

*Primary Examiner* — Christian P Chace
*Assistant Examiner* — Rocio Del Mar Perez-Velez
(74) *Attorney, Agent, or Firm* — Haynes and Boone, LLP

(57) ABSTRACT

Methods and apparatus for cut-through cache memory management in write command processing on a mirrored virtual volume of a virtualized storage system, the virtual volume comprising a plurality of physical storage devices coupled with the storage system. Features and aspects hereof within the storage system provide for receipt of a write command and associated write data from an attached host. Using a cut-through cache technique, the write data is stored in a cache memory and transmitted to a first of the plurality of storage devices as the write data is stored in the cache memory thus eliminating one read-back of the write data for transfer to a first physical storage device. Following receipt of the write data and storage in the cache memory, the write data is transmitted from the cache memory to the other physical storage devices.

16 Claims, 5 Drawing Sheets

FIG. 5

METHODS AND APPARATUS FOR CUT-THROUGH CACHE MANAGEMENT FOR A MIRRORED VIRTUAL VOLUME OF A VIRTUALIZED STORAGE SYSTEM

RELATED PATENTS

This patent is related to commonly owned U.S. patent application Ser. No. 12/761,452 entitled METHODS AND APPARATUS FOR MANAGING ASYNCHRONOUS DEPENDENT I/O FOR A VIRTUAL FIBRE CHANNEL TARGET that is hereby incorporated by reference.

BACKGROUND

1. Field of the Invention

The invention relates generally to virtualized storage systems and more specifically relates to methods and apparatus to utilize cut-through cache memory management to reduce cache memory bandwidth utilization in writing to a mirrored virtual volume of a virtualized storage system.

2. Discussion of Related Art

Mirrored storage volumes are known to provide enhanced reliability for stored data. Redundant Array of Independent Disks (RAID) management level 1 is exemplary of well-known mirroring techniques. A mirrored volume stores identical copies of data on multiple physical storage devices (i.e., disk drives) such that failure of one of the duplicate storage devices does not lose data or render the storage volume inaccessible. A storage controller of the storage system typically hides the physical storage characteristics from a user (i.e., from attached host systems) such that the user perceives a standard storage volume and knows nothing of the physical mapping of the mirrored logical volume to multiple physical devices. A write request directed to the virtual volume is processed by the storage system by generating multiple physical write operations within the storage system to duplicate the data on the multiple storage devices that comprise the mirrored volume.

Virtualized storage systems extend the concepts of RAID to hide physical storage aspects for many types of volumes (whether the volume uses RAID management techniques or not). In such virtualized storage systems, the processing to duplicate mirrored data over a plurality of physical storage devices that comprise a mirrored virtual volume is totally performed by a control device (i.e., an appliance) coupled with the storage system or integral within the storage system. Some such controllers common in Fibre Channel environment (i.e., a Data Path Module or "DPM") use a store-and-forward (SAF) process to first store data written to the virtual target device (i.e., directed to the mirrored virtual volume) into a local cache memory. The controllers then read back the data to forward the data that is replicated across two or more physical targets. Due to the nature of SAF techniques (i.e., write once; read back multiple times), the bandwidth of the controller available to the host is limited to ⅓, ¼, or ⅕ the cache memory bandwidth when the data is replicated across two, three or four physical targets, respectively. For example, assume a controller (i.e., a DPM) has a cache memory bandwidth rated at 1 GB/s. The SAF processing techniques limits data replication across two physical storage devices to 333 MB/s (a first access to cache to store the write data followed by two accesses to read the cached write data back for transmission to the two physical storage device that comprise a mirrored virtual volume).

Some prior techniques have attempted to improve the performance of the controller (e.g., a DPM) by using cache-less techniques in a Fibre Channel (FC) storage system. "Cache-less" cut-through mirroring techniques eliminate the need for cache memory (and hence the cache memory bandwidth utilization limitations). Such a cache-less cut-through simply takes the inbound write data and modifies the Fibre Channel frame header so that the frame is transformed and routed directly to the plurality of physical storage devices (i.e., physical FC target devices). Doing so makes it appear to the physical FC target devices that the source of the write data was from the "virtual initiator" of the DPM. This prior method provides a "near-wire rate" data replication rate across multiple physical target devices (e.g., near the full bandwidth of the exemplary controller's Fibre Channel subsystem). However, this prior solution requires hardware in the FC paths of the DPM that has the capability to replicate inbound frames and direct them to multiple physical FC target devices. Cache-less replication techniques such as this suffer from the fact that all physical FC target devices must be in a state ready to accept the write data. This makes the solution highly prone to deadlock and unstable replication operations. Write latency is increased since multiple targets must rendezvous at a common ready state (FCP_XRDY state) so that data frames may cut-through from the virtual initiator.

Thus it is an ongoing challenge to improve (i.e., reduce) cache memory bandwidth utilization in a virtualized storage system when processing write requests to a mirrored virtual volume.

SUMMARY

The present invention solves the above and other problems, thereby advancing the state of the useful arts, by providing methods and apparatus for improving performance of a virtualized storage system including cache memory by using cut-through techniques for a first of multiple physical storage devices of the multiple physical storage devices that comprise a mirrored virtual volume.

In one aspect hereof, a method is provided operable in a virtualized storage system. The storage system comprising a plurality of storage devices. The method comprising receiving a write command from a host system directed to a virtual volume of the storage system. The virtual volume comprising mirrored data on multiple storage devices. The method also comprises detecting that a first storage device of the multiple storage devices is ready to receive write data associated with the write command and receiving the write data from the host system responsive to detecting that the first storage device is ready to receive write data. The method further comprises storing the write data in a cache memory and transmitting the write data to the first storage device as the write data is stored in the cache memory. The method still further comprises transmitting the write data from the cache memory to other storage devices of the multiple storage devices.

Another aspect hereof provides a method operable in a virtualized storage system. The storage system adapted to couple with a Fibre Channel (FC) initiator and adapted to couple with a plurality of physical FC target devices and adapted to define a virtual FC mirrored volume comprising the plurality of physical FC target devices. The method comprising receiving an FCP_CMD write command from the FC initiator and transmitting a multicast FCP_CMD write command to each of the plurality of physical FC target devices responsive to receipt of the FCP_CMD write command. The method also comprises receiving an FCP_XRDY from a first physical FC target device of the plurality of physical FC target devices to respond to the multicast FCP_CMD write command and transmitting an FCP_XRDY to the FC initiator responsive to receipt of the FCP_XRDY from the first physical FC target device. The method further comprises receiving an FCP_DATA including write data from the FC initiator responsive to transmission of the FCP_XRDY. The method further includes storing the write data in a cache memory and transmitting an FCP_DATA including the write data to the first physical FC target device as the write data is stored in the cache memory. The method still further includes transmitting an FCP_DATA including the write data from the cache memory to each other FC physical target device of the plurality of physical FC target devices.

Yet another aspect hereof provides apparatus in a virtualized storage system. The storage system adapted to couple with a host system and adapted to couple with a plurality of storage devices, the storage system adapted to define a mirrored virtual volume comprising the plurality of storage devices. The apparatus comprising a host interface adapted to exchange information with an attached host system and a back-end interface adapted to exchange information with the plurality of storage devices. The apparatus further comprises a cache memory and a virtual I/O processor coupled with the host interface and coupled with the back-end interface and coupled with the cache memory. The virtual I/O processor adapted to receive write commands from the host system and adapted to transmit write data associated with a received write command to the cache memory and to the plurality of storage devices. The virtual I/O engine further comprises a cut-through cache processor and a forwarding processor. The cut-through cache processor adapted to receive a write command and associated write data from the host system and adapted to store the write data in the cache memory and adapted to transmit the write data to a first storage device of the plurality of storage devices as the write data is stored in the cache memory. The forwarding processor adapted to transmit the write data from the cache memory to the other storage devices of the plurality of storage devices.

DETAILED DESCRIPTION OF THE DRAWINGS

Figure 1:
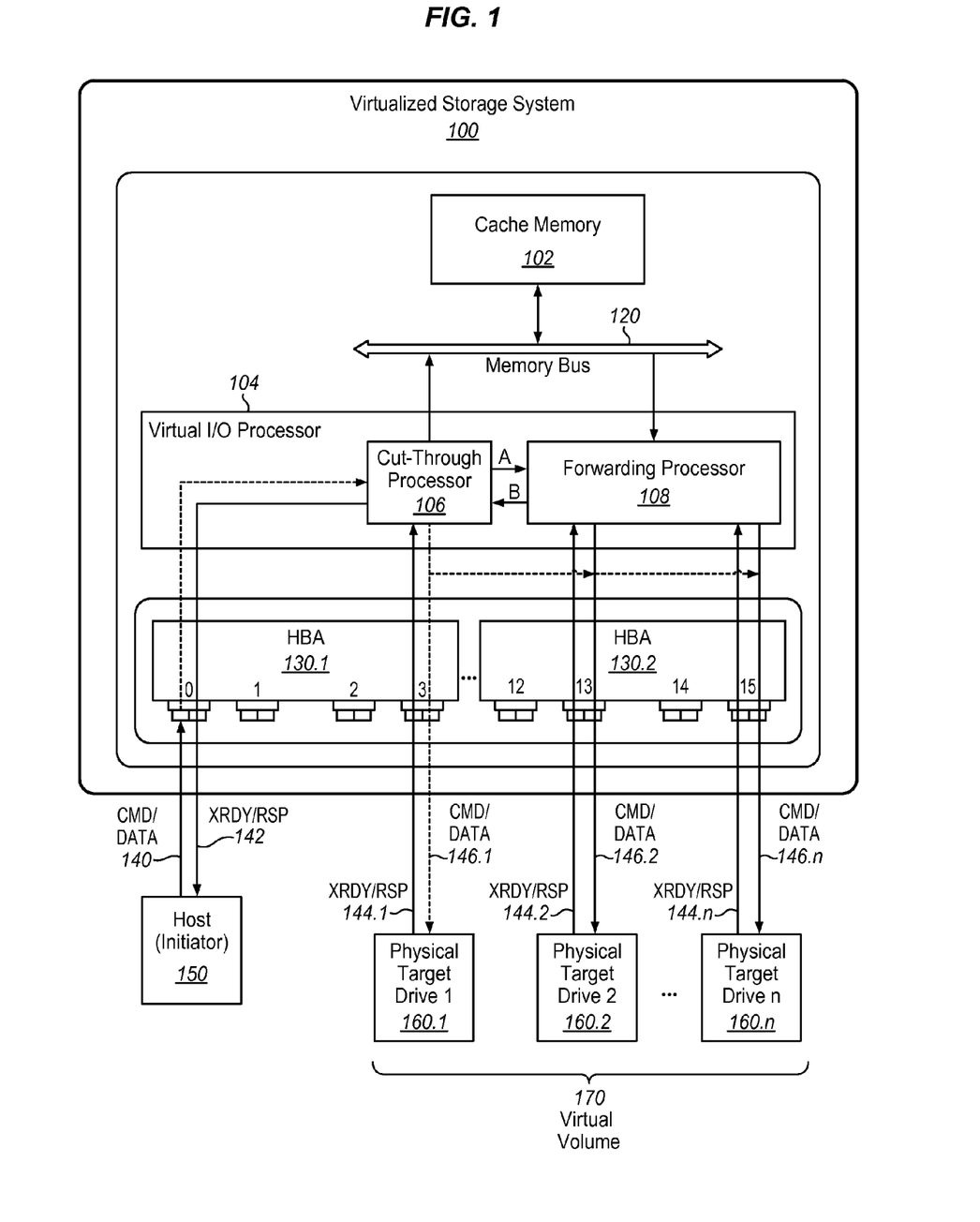
FIG. 1 is a block diagram of an exemplary virtualized storage system enhanced in accordance with features and aspects hereof to reduce cache memory bandwidth utilization in access to a mirrored virtual volume.

FIG. 1 is a block diagram of an exemplary virtualized storage system 100 enhanced in accordance with features and aspects hereof to provide improved bandwidth utilization of a cache memory. More specifically, system 100 provides for "cut-through" utilization of cache memory 102 in the context of multiple dependent I/O operations responsive to a host system 150 write request directed to a mirrored virtual volume 170 coupled with system 100. Virtualized storage system 100 includes a cache memory 102 coupled with a virtual I/O processor 104 through memory bus 120. Virtual I/O processor 104 is adapted to couple with a host system 150 (e.g., an initiator) through a host interface (e.g., a port of HBA 130.1). Virtual I/O processor 104 is also adapted to couple through a back-end interface (e.g., ports of HBA 130.1 and HBA 130.2) with a plurality of physical target devices 160.1 through 160.n (e.g., storage devices such as disk drives) that comprise a mirrored virtual volume 170. As shown in FIG. 1, the host interface and the back-end interface may both utilize the same communication media and protocol through the host bus adapters (HBAs) 130.1 and 130.2. In one exemplary embodiment, host system (initiator) 150 as well as physical target devices 160.1 through 160.n may utilize Fibre Channel communication media and protocols and thus HBAs 130.1 and 130.2 may provide Fibre Channel interfaces for virtual I/O processor 104. Those of ordinary skill in the art will readily recognize that any suitable communication media and protocols may be utilized for both the host interface and the back-end interface. Further, the host interface and back-end interface may each utilize different HBAs and/or different protocols and communication media.

Virtual I/O processor 104 may be implemented as any suitable processing component including, for example, customized application specific integrated circuits or suitably programmed general/special purpose processors. In one exemplary embodiment, virtual I/O processor 104 comprises custom circuit components adapted for rapid processing of I/O requests received from host system 150. Other components of virtualized storage system 100 (not shown) may be implemented as suitably programmed instructions operating in a general/special purpose to computing device for higher-level management and administrative functions as well as for higher layer protocol management and I/O processing. Such an embodiment is often referred to as "split path" in the sense that a fast path is provided by virtual I/O processor 104 to rapidly handle most common read and write requests received from a host system 150. A software implemented path (typically slower performance) provides other management and administrative functions as well as processing of less critical I/O requests and exception handling.

Virtual I/O processor 104 may include a cut-through processor component 106 adapted to initially handle processing of a received write request from host system 150. Virtual I/O processor 104 may also include forwarding processor component 108 adapted to handle subsequent processing of a received write request from host system 150. Cut-through processor component 106 and forwarding processor component 108 may be implemented as custom logic circuit components within virtual I/O processor 104. The function of such logic circuits is discussed further herein below. Though shown in FIG. 1 as distinct components, cut-through processor component 106 and forwarding processor component 108 may be tightly integrated with one another and with other logic within virtual I/O processor 104 as a matter of design choice.

In operation, virtual I/O processor 104 receives a write request from host system 150 via path 140. The received write request directs the storage system 100 to prepare for a write operation to a mirrored virtual volume 170 coupled with the storage system 100. The associated write data is transmitted to the virtual I/O processor 104 later when the virtual I/O processor 104 indicates its readiness to receive the write data. Upon receipt of the write request, cut-through processor component 106 of virtual I/O processor 104 transmits a corresponding write command to each of the physical target devices 160.1 through 160.n that comprise the identified mirrored virtual volume 170. The write commands are forwarded to each physical target via a corresponding communication path 146.1 through 146.n associated with each physical target device 160.1 through 160.n. Following transmission of the write commands to the various physical target devices, cut-through processor component 106 of virtual I/O processor 104 awaits receipt of a status from a first physical device of the plurality of physical target devices (160.1 through 160.n) indicating its readiness to receive the write data associated with the write request from the host system 150. Each device 160.1 through 160.n may transmit its readiness status via its corresponding path 144.1 through 144.n. Though any of the plurality of physical target devices may be the first to indicate its readiness, assume, for this exemplary discussion, that device 160.1 is the first device to indicate its readiness to receive the write data.

Upon receipt of such a first ready status indication, cut-through processor component 106 of virtual I/O processor 104 transmits a ready status indication to host system 150 via path 142. Responsive to receipt of the ready status indication from virtual I/O processor 104, host system 150 transmits the write data to virtual I/O processor 104 via path 140. Responsive to receipt of the write data from host system 150, cut-through processor component 106 of virtual I/O processor 104 stores the received write data in cache memory 102 via memory bus 120. Substantially simultaneously with the storing of the write data in cache memory 102, cut-through processor component 106 also transmits the write data to physical target device 160.1 (e.g., the first responding physical target device that indicated its readiness for receipt of the write data). If the transmission of write data to device 160.1 is successful, device 160.1 transmits a response to cut-through processor component 106 via path 144.1 indicating success in processing the write data. Responsive to receipt of the successful status from device 160.1, cut-through processor component 106 applies a signal (label "A") to forwarding processor component 108 indicating readiness for transmission of the write data to others of the plurality of physical target devices 160.2 through 160.n. Forwarding processor component 108 then transmits the write data from cache memory 102 to the other physical target devices 160.2 through 160.n via corresponding paths 146.2 through 146.n. The other devices 160.2 through 160.n return a response to forwarding processor component 108 indicating success or failure of the processing of the received write data. As each of the other target devices 160.2 through 160.n indicate success in receiving the write data, forwarding processor component 108 determines when all physical target devices have successfully received the write data. If all physical target devices successfully receive the write data, forwarding processor component 108 applies its signal (label "B") to cut-through processor component 106 which, in turn, transmits a successful response to host system 150 via path 142. Conversely, if either cut-through processor component 106 or forwarding processor component 108 detects that any of the physical target devices 160.1 through 160.n failed to successfully receive and process the transmitted write data, an appropriate failure status is returned by cut-through processor component 106 to host system 150 via path 142.

In one exemplary embodiment, virtualized storage system 100 provides Fibre Channel (FC) interfaces to the host system 150 (e.g., an FC initiator) and to the plurality of physical FC target devices 160.1 through 160.n. In such an FC environment, the write request from host system 150 (e.g., an FC initiator) and the write commands forwarded to each of the physical FC target devices 160.1 through 160.n are transmitted as FCP_CMD frames on the corresponding Fibre Channel paths 140 and 146.1 through 146.n. In like manner, the write data is transmitted as FCP_DATA frames on corresponding Fibre Channel paths 140 and 146.1 through 146.n. Status indicating readiness for receipt of write data is transmitted as an FCP_XRDY frame on corresponding Fibre Channel paths 142 and 144.1 through 144.n. In like manner, response status information regarding success or failure in the transmission of the write data is transmitted as FCP_RSP frames on corresponding Fibre Channel paths 142 and 146.1 through 146.n.

Those of ordinary skill in the art will readily recognize numerous additional and equivalent circuits, modules, and component within a fully functional virtualized storage system 100. Such additional and equivalent circuits, modules, and component are omitted herein for simplicity and brevity of this discussion.

Figure 2:
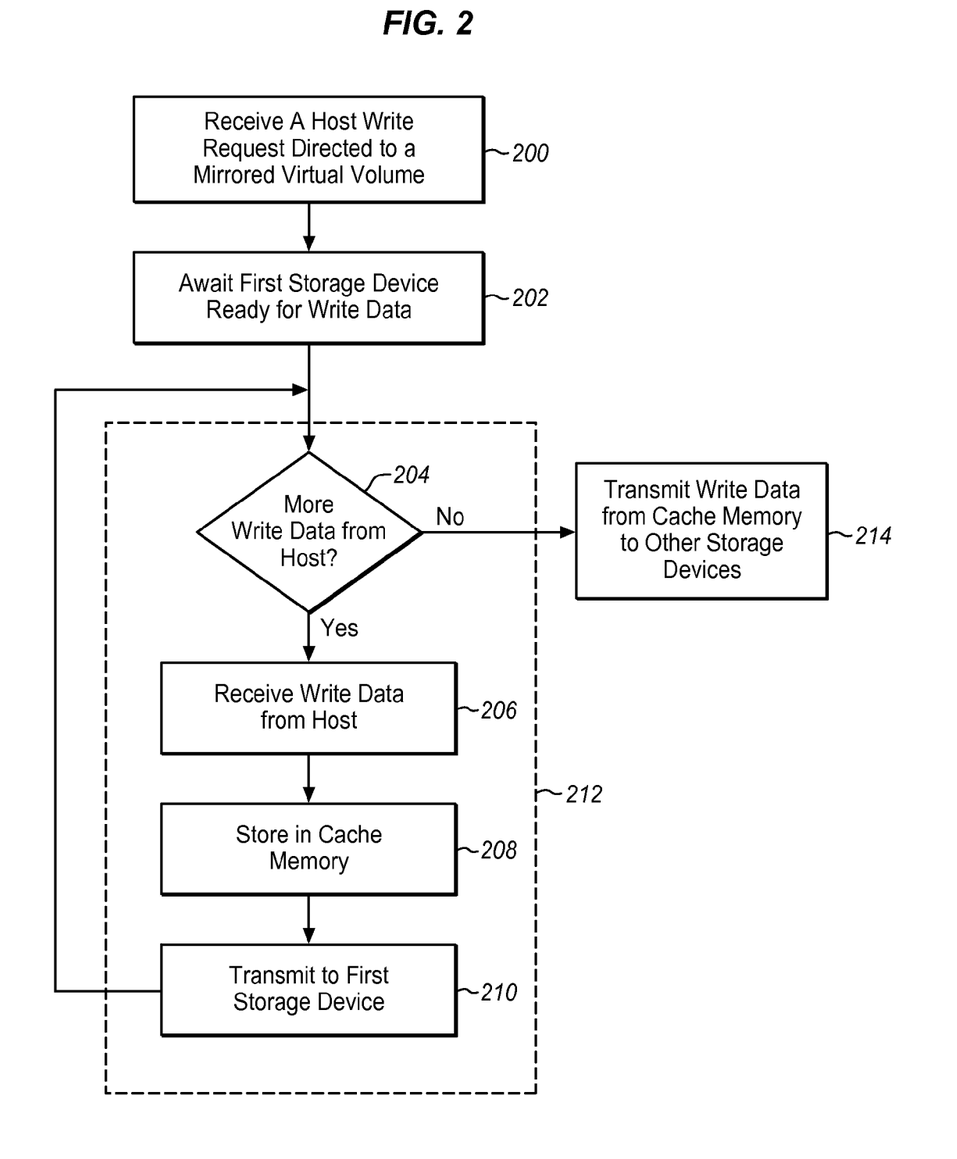
FIG. 2 is a flowchart describing an exemplary method in accordance with features and aspects hereof to reduce cache memory bandwidth utilization in access to a mirrored virtual volume of a virtualized storage system.

FIG. 2 is a flowchart describing an exemplary method in accordance with features and aspects hereof operable within an enhanced virtualized storage system such as system 100 of FIG. 1. More specifically, the method of FIG. 2 may be operable in the virtual I/O processor 104 of system 100 in FIG. 1 and still more specifically within the cut-through processor component 106 and forwarding processor component 108 of virtual I/O processor 104. At step 200, the virtualized storage system receives a host write request from an attached host system directed to a mirrored virtual volume managed by the enhanced virtualized storage system. The addressed mirrored virtual volume comprises mirrored/duplicated data on a plurality of physical storage devices (e.g., disk drives). Step 202 then awaits a first status indicator from any of the plurality of storage devices indicating its readiness to receive write data associated with the host system's write request. Any one of the plurality of storage devices may be the first to indicate its readiness to receive the write data. When step 202 detects receipt of such a first status message indicating readiness for the write data, steps 204 through 210 provide substantially parallel processing by the storage system to receive the write data and simultaneously store the write data in the cache memory and transmit the write data to the first storage device responding with an indication of its readiness to receive the write data. The substantially parallel operation of steps 204 through 210 is indicated by the dashed line surrounding as step 212. More specifically, step 204 detects whether all the expected write data is expected to be received from the host system. If not, step 206 receives the next portion of write data from the host system. Step 208 stores the next received portion of the write data in the cache memory, and substantially simultaneously, step 210 transmits the received write data to the first storage device that indicated its readiness to receive the write data. The processing of steps 204 through 210 (e.g., step 212) are then repeated until all the write data has been received from the host system.

The processing steps 204 through 210, collectively, is often referred to as cut-through cache memory processing in that the received write data is simultaneously stored in the cache memory and transmitted to the first storage device. This cut-through cache memory processing helps reduce cache memory bandwidth utilization by eliminating the need to read the write data from the cache memory for transmission to at least one of the plurality of storage devices.

Upon completion of the cut-through cache processing indicated as step 212 (as detected by step 204), step 214 then transmits the write data from the cache memory to the other storage devices of the plurality of storage devices thus completing transfer of the write data from the host system to each of the plurality of storage devices.

Figure 3:
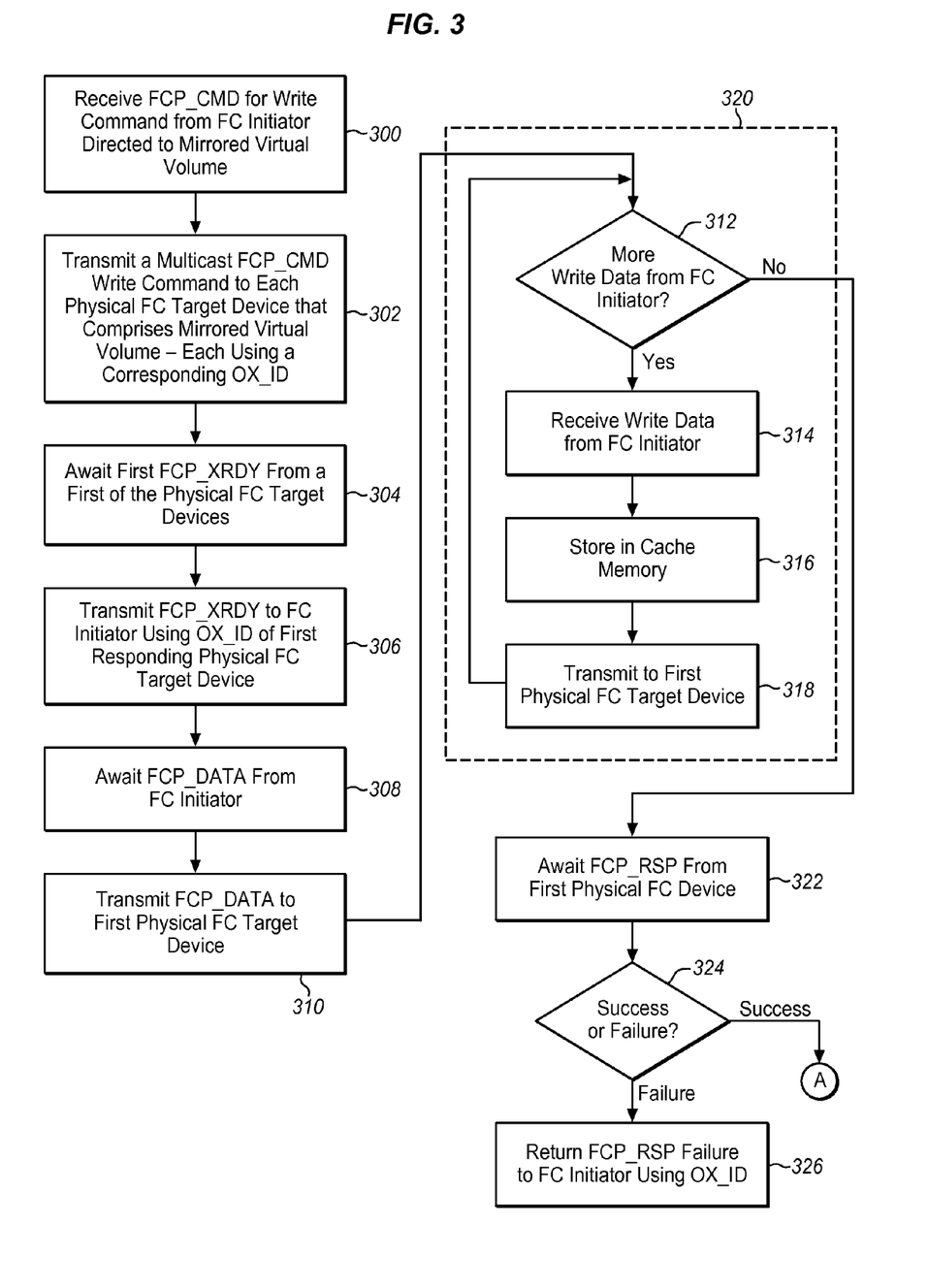
FIGS. 3 and 4 combined are a flowchart of another exemplary method in accordance with features and aspects hereof to reduce cache memory bandwidth utilization in access to a mirrored virtual volume of a virtualized storage system.

FIG. 3 is a flowchart describing an exemplary method in accordance with features and aspects hereof for improving cache memory bandwidth utilization within a virtualized storage system. The method of FIG. 3 provides additional details relative to the method of FIG. 2 useful in the context of Fibre Channel communications between the storage system and the host system (e.g., an FC initiator) and between the storage system and the storage device is (e.g., physical FC target devices). Though expressed as exemplary FC communication exchanges, those of ordinary skill in the art will readily recognize that similar methods may be applied to other communication media and protocols.

At step 300, an FCP_CMD frame is received at the virtualized storage system from the FC initiator. The write command is directed to a mirrored virtual volume of the storage system. The mirrored virtual volume comprises a plurality of physical FC target devices (e.g., FC disk drives) on which identical data is mirrored/duplicated. Step 302 then transmits a multicast FCP_CMD frame write command to each of the physical FC target devices that comprise the mirrored virtual volume. Each multicast FCP_CMD frame may use a corresponding originator exchange identifier (OX_ID) in accordance with Fibre Channel standards. Step 304 than awaits receipt of a first FCP_XRDY from a first of the physical FC target devices indicating its readiness to receive the write data associated with the received write command. Responsive to receipt of the first FCP_XRDY, step 306 transmits an FCP_XRDY to the FC initiator using the OX_ID of the first responding physical FC target device indicating its readiness to receive the write data. Step 308 than awaits receipt of an FCP_DATA frame from the FC initiator indicating transmission of the write data from the FC initiator to the storage system. Upon receipt of the FCP_DATA frame from the FC initiator, step 310 transmits an FCP_DATA frame to the first physical FC target device indicating its readiness to receive the write data (e.g., the physical FC target device corresponding to the OX_ID previously identified).

Step 312 through 318 represent substantially parallel processing (collectively identified as step 320 by the dashed line surrounding them) to transfer the write data from the host system to both the cache memory and the first physical FC target device. As described above, such processing is often referred to as cut-through cache processing in that the write data received from the host system is applied substantially simultaneously to both the cache memory and the first physical FC target device. Specifically, step 312 determines whether all write data has been received from the FC initiator. If not, step 314 receives the next portion of write data from the FC initiator, step 316 stores the received write data in cache memory, and step 318 substantially in parallel with the performance of steps 314 and 316 transmits the received write data to the first physical FC target device. Processing then continues looping back to step 312 until all of the write data is received from the FC initiator.

Upon completion of the cut-through cache processing of step 320, step 322 awaits receipt of an FCP_RSP frame from the first physical FC target device indicating success or failure of receipt and processing of the write data. Step 324 then determines whether the received FCP_RSP frame indicates success or failure by the first physical FC target device. If the first physical FC target device indicated a failure response, step 326 returns an FCP_RSP failure status to the FC initiator using the same OX_ID identified in accordance with the Fibre Channel protocols. Since the first physical FC target device failed to successfully receive and/or record the write data, a failure response may be returned to the FC initiator without attempting to transmit the write data to the other physical FC target devices.

Figure 4:
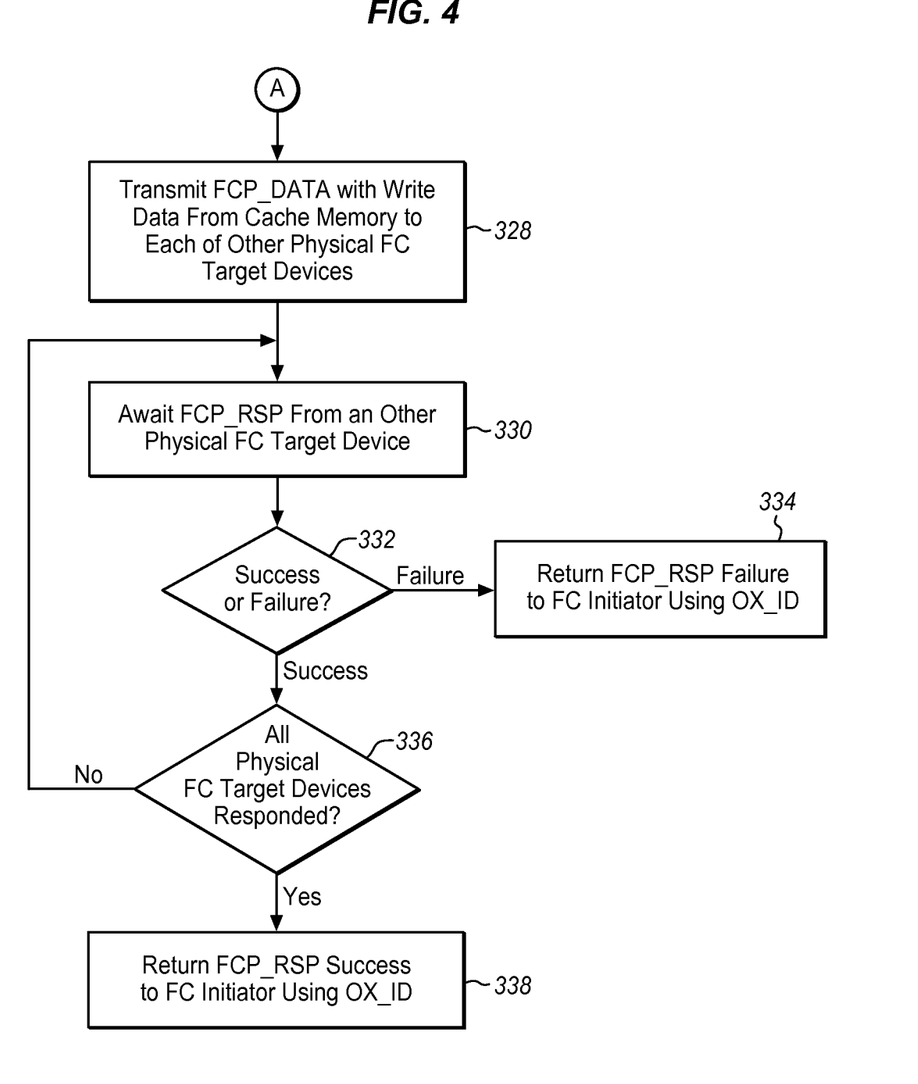

If step 324 determines that the first FC target device succeeded in recording the received write data, processing continues at label "A" of FIG. 4. Step 328 in FIG. 4 then transmits an FCP_DATA frame with the write data retrieved from the cache memory to each of the other physical FC target devices that comprise the mirrored virtual volume. Step 330 then awaits receipt of an FCP_RSP frame from one of the other physical FC target devices that received the write data by operation of step 328. Responsive to receipt of such an FCP_RSP frame from one of the other physical FC target devices, step 332 determines whether the response indicates success or failure. If the response indicates failure, step 334 returns an FCP_RSP frame indicating failure to the FC initiator again using the OX_ID previously identified in accordance with Fibre Channel protocols. If the received response indicates success, step 336 next determines whether all physical FC target devices have responded to the transmission of the write data. If not, processing continues looping back to step 330 to await receipt of a next FCP_RSP frame from yet another physical FC target device. Once all FC target devices have responded indicating success, step 338 returns an FCP_RSP frame indicating successful completion of the write command to the FC initiator again using the OX_ID previously identified.

In accordance with Fibre Channel protocols, it is important that communications with the FC initiator utilize a single exchange ID typically referred to as the responder exchange ID (RX_ID). The OX_ID associated with the first responding physical FC target device may therefore be selected as indicated by the method of FIGS. 3 and 4 as the "primary" exchange ID and thus utilized as the RX_ID in communications with the FC initiator. As a matter of design choice, any particular exchange ID may be selected for communications with the FC initiator. Where the virtualized I/O processing described in FIGS. 3 and 4 is designed to be integrated with other legacy logic circuits or modules, it may be important to select a particular exchange ID for purposes of exception processing, retry handling, etc. in cooperation with the legacy logic Thus, the selection of the OX_ID associated with the first responding physical FC target device as described in FIGS. 3 and 4 is merely exemplary of one possible embodiment for implement features and aspects hereof to allow integration with other legacy logic of the virtualized storage system.

Those of ordinary skill in the art will readily recognize numerous additional and equivalent steps that may be provided in the methods of FIGS. 2 through 4 in a fully functional virtualized storage system. Such additional and equivalent steps provide may provide, for example, processing of well-known features for administration of the virtualized storage system, for error and exception handling, etc. Such additional and equivalent steps are omitted herein for brevity and simplicity of this discussion relating to features and aspects hereof.

Figure 5:
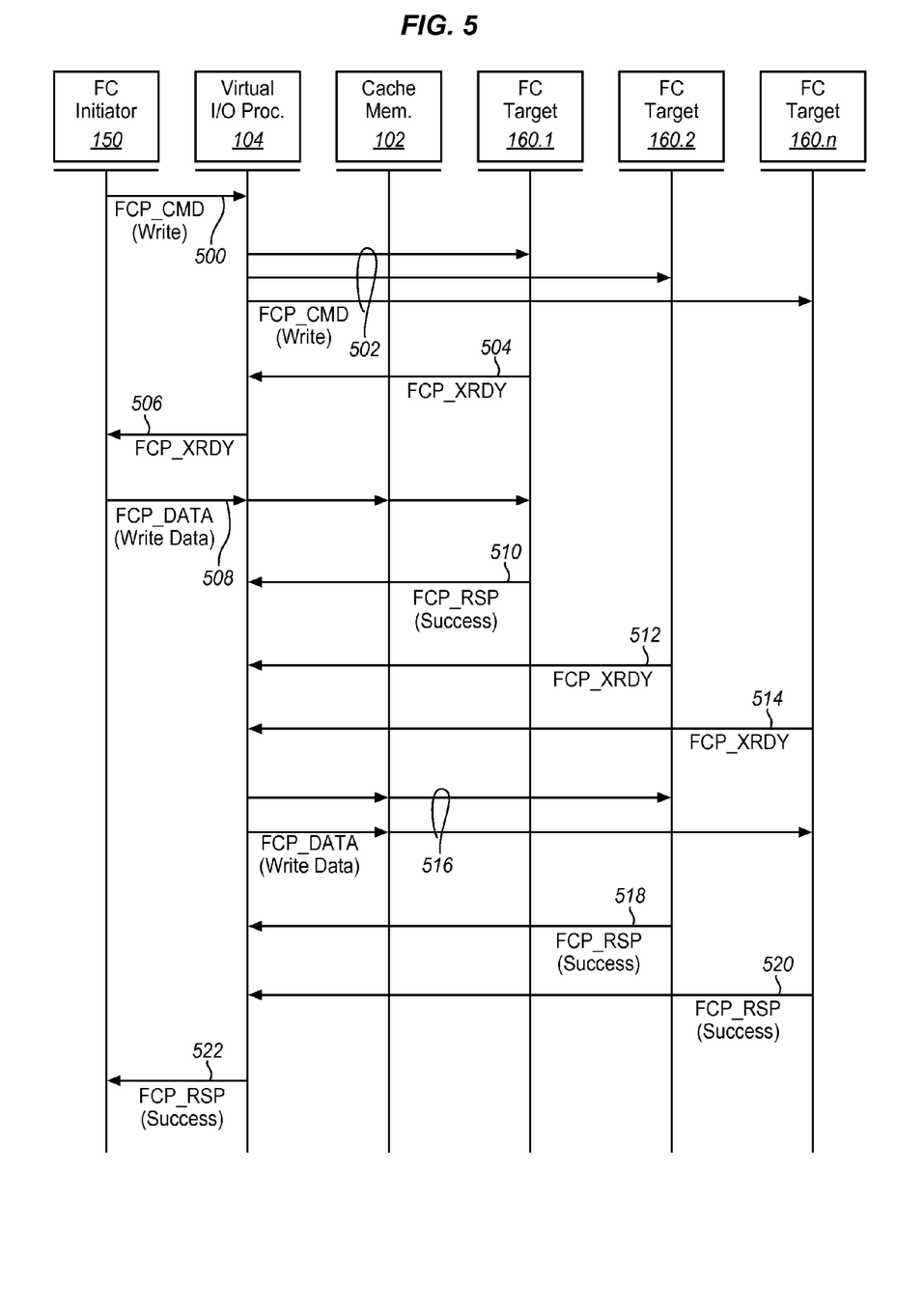
FIG. 5 is a diagram of exemplary messages exchanged in accordance with features and aspects hereof to reduce cache memory bandwidth utilization in access to a mirrored virtual volume of a virtualized storage system.

FIG. 5 is a diagram describing operation of an exemplary enhanced virtualized storage system by way of exemplary message exchanges between various components of the enhanced system as presented, for example, in FIG. 1. Each vertical line in FIG. 5 represents a component of the enhanced system that transmits and/or receives a message. A label identifying the component with respect to the exemplary virtualized storage system of FIG. 1 is presented at the top of each vertical line. Horizontal arrows in FIG. 5 represent the transmission and corresponding receipt of one or more identified messages associated with operation of the enhanced virtualized storage system. The messages shown in FIG. 5 represent an exemplary embodiment utilizing Fibre Channel communications between an FC initiator 150 (e.g., a host system) and the virtual I/O processor 104 of the enhanced virtual storage system and between the virtual I/O processor 104 and the various physical FC target devices 160.1 through 160.n. Those of ordinary skill in the art will readily recognize similar messages that may be exchanged in accordance with features and aspects hereof utilizing other communication media and protocols.

Message 500 represents the transmission of an FCP_CMD frame for a write request from the FC initiator 150 to the virtual I/O processor 104 of the enhanced virtualized storage system. The write request frame indicates the desire of the FC initiator 150 to commence processing for writing data on an identified virtual volume within the enhanced virtualized storage system. Responsive to receipt of the write request, virtual I/O processor 104 sends messages 502 to each of the physical FC target devices 160.1 through 160.n that comprise the identified mirrored virtual volume. In particular, an FCP_CMD frame is transmitted from the virtual I/O processor 104 to each of physical FC target devices 160.1 through 160.n. The FCP_CMD frames transmitted to each FC target may be transmitted substantially in parallel or may be transmitted sequentially. After each physical FC target device has received its write command, one of the physical FC target devices will be a first device to respond to the virtual I/O processor 104 indicating its readiness to receive the write data associated with the write command. Message 504 represents transmission of an FCP_XRDY frame to virtual I/O processor 104 from a first such FC target indicating its readiness to receive write data. For example, physical FC target device 160.1 transmits an FCP_XRDY frame to virtual I/O processor 104 indicating that it is ready to receive the write data corresponding to the write command. Those of ordinary skill in the art will readily recognize that any of the plurality of physical FC target devices 160.1 through 160.n may be the first such device to respond indicating its readiness. Thus, device 160.1 being the first responder is intended merely as exemplary for purposes of this discussion.

Responsive to receipt of the first such ready status message, virtual I/O processor 104 sends a message to FC initiator 150 indicating it is ready to receive the write data corresponding to the write request. Specifically, virtual I/O processor 104 transmits an FCP_XRDY frame 506 to the FC initiator 150 indicating that virtual I/O processor 104 is ready to receive the write data. Responsive to receipt of the ready status from the virtual I/O processor 104, FC initiator 150 sends a message 508 to the virtual I/O processor 104 providing the write data. Specifically, FC initiator 150 transmits an FCP_DATA frame along with the write data to virtual I/O processor 104. As indicated by the sequence of arrows comprising message 508, virtual I/O processor 104 records the received write data in the cache memory 102 and, substantially simultaneously, transmits the received write data to the first responding physical FC target device 160.1. As noted above, this cut-through cache processing reduces cache memory bandwidth utilization by eliminating the need to read the write data from the cache memory for at least one of the plurality of physical FC target devices that comprise the mirrored virtual volume.

Following transmission of the write data to the first physical FC target device 160.1 (substantially simultaneous with storing of the write data in the cache memory 102) first responding physical FC target device 160.1 sends a status message 510 indicating success or failure in receipt and recordation processing of the write data. Specifically, first responding physical FC target device 160.1 transmits an FCP_RSP frame to virtual I/O processor 104 indicating its success or failure. The remainder of this discussion of FIG. 5 presumes that the response indicates a successful completion. Those of ordinary skill in the art will readily recognize corresponding message exchanges relating to a failed status as discussed above with respect to FIGS. 1 through 4.

Presuming a successful response is received from the first physical FC target device 160.1, virtual I/O processor 104 awaits indication from each of the other physical FC target devices that each device is ready for receipt of the write data. Messages 512 and 514 represent transmission of FCP_XRDY frames from each of the other physical FC target devices (160.2 through 160.n). Those of ordinary skill in the art will recognize that the FCP_XRDY frames transmitted in messages 512 and 514 from each of the other physical FC target devices may be received at any time following the transmission of the write command to each of the devices as indicated above in message 502. Responsive to receipt of a ready status from each of the other physical FC target devices, virtual I/O processor 104 sends the write data as message 516 from the cache memory (where the write data was previously stored by message 508) to each of the other physical FC target devices. Specifically, message 516 comprises transmission of FCP_DATA frames including the write data read from the cache memory 102 to each of the other physical FC target devices 160.2 through 160.n. Following transmission of the write data to each of the other physical FC target devices, virtual I/O processor 104 awaits receipt of a status response from each of the other physical FC target devices. Messages 518 and 520 represent transmission of FCP_RSP frames from each of the other physical FC target devices 160.2 through 160.n back to the virtual I/O processor 104. Presuming each of the other physical FC target devices responds with a successful status, virtual I/O processor 104 sends a message 522 to the FC initiator indicating success of the write request. Specifically, virtual I/O processor 104 transmits to FC initiator 150 an FCP_RSP frame indicating successful completion of the original write request.

As noted above, other messages may be exchanged responsive to a failure status message from any of the plurality of physical FC target devices 160.1 through 160.n. In particular, a failure message in the response (message 510) from the first physical FC target device may result in transmission of a failure response directly to the FC initiator 150 by virtual I/O processor 104 without further processing of the received write data by any of the other physical FC target devices 160.2 through 160.n. In addition, as noted above, the cut-through cache memory processing associated with transmission of write data to the first FC target device 160.1 may also include simultaneous transmission to others of the plurality of physical FC target devices that indicate their readiness to receive the write data in time for the write data transmission (message 508) from the FC initiator 150. Other physical FC target devices that have not so indicated their readiness may receive the write data later as indicated by message 516 from the write data read from the cache memory 102. Further, those of ordinary skill in the art will readily recognize that the message exchanges depicted in FIG. 5 may encompass any number of physical FC target devices that comprise the mirrored virtual volume While the invention has been illustrated and described in the drawings and foregoing description, such illustration and description is to be considered as exemplary and not restrictive in character. One embodiment of the invention and minor variants thereof have been shown and described. In particular, features shown and described as exemplary software or firmware embodiments may be equivalently implemented as customized logic circuits and vice versa. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A method operable in a virtualized storage system, the storage system comprising a plurality of storage devices, the method comprising:
   receiving a write command from a host system directed to a virtual volume of the storage system, the virtual volume comprising mirrored data on multiple storage devices;
   detecting that a first storage device of the multiple storage devices is ready to receive write data associated with the write command;
   receiving the write data from the host system responsive to detecting that the first storage device is ready to receive write data;
   storing the write data in a cache memory;
   transmitting the write data to the first storage device as the write data is stored in the cache memory; and
   after completion of transmitting the write data to the first storage device, transmitting the write data from the cache memory to other storage devices of the multiple storage devices.

2. The method of claim 1 further comprising:
   detecting that the transmission of the write data to the first storage device was successful.

3. The method of claim 2 wherein the step of transmitting the write data from the cache memory to the other storage devices further comprises:
   transmitting the write data from the cache memory to other storage devices of the multiple storage devices responsive to detecting that the transmission of the write data to the first storage device was successful.

4. The method of claim 2 further comprising:
   detecting that the transmission of write data to the other storage devices was successful; and
   returning a successful status to the host system in response to detecting that the transmission of the write data was successful to all of the multiple storage devices.

5. The method of claim 4 further comprising:
   returning a failure status to the host system in response to detecting that transmission of the write data to any of the multiple storage devices failed.

6. A method operable in a virtualized storage system, the storage system adapted to couple with a Fibre Channel (FC) initiator and adapted to couple with a plurality of physical FC target devices and adapted to define a virtual FC mirrored volume comprising the plurality of physical FC target devices, the method comprising:
   receiving an FCP_CMD write command from the FC initiator;
   transmitting a multicast FCP_CMD write command to each of the plurality of physical FC target devices responsive to receipt of the FCP_CMD write command;
   receiving an FCP_XRDY from a first physical FC target device of the plurality of physical FC target devices to respond to the multicast FCP_CMD write command;
   transmitting an FCP_XRDY to the FC initiator responsive to receipt of the FCP_XRDY from the first physical FC target device;
   receiving an FCP_DATA including write data from the FC initiator responsive to transmission of the FCP_XRDY;
   storing the write data in a cache memory;
   transmitting an FCP_DATA including the write data to the first physical FC target device as the write data is stored in the cache memory; and
   transmitting an FCP_DATA including the write data from the cache memory to each other FC physical target device of the plurality of physical FC target devices, wherein the step of transmitting the FCP_DATA to each other physical FC target device further comprises:
      transmitting the FCP_DATA including the write data from the cache memory to each other physical FC target device responsive to receiving an FCP_RSP from the first physical FC target device indicating successful processing.

7. The method of claim 6 where each multicast FCP_CMD write command includes a corresponding originator exchange identifier (OX_ID), and
   the method further comprising:
      designating the OX_ID used in the multicast FCP_CMD write command transmitted to the first physical FC target device as a responder exchange identifier (RX_ID).

8. The method of claim 7 wherein the step of transmitting the FCP_XRDY to the FC initiator further comprises transmitting an FCP_XRDY including the RX_ID.

9. The method of claim 7 further comprising:
   receiving an FCP_RSP from the first physical FC target device responsive to transmission of the FCP_DATA to the first physical FC target device where the FCP_RSP indicates success of failure of processing of the write data on the first physical FC target device.

10. The method of claim 6 further comprising:
    receiving an FCP_RSP from each of the other physical FC target devices indicating success of failure of processing of the write data on each other physical FC target device; and
    returning an FCP_RSP to the FC initiator indicating success in response to receipt of an FCP_RSP indicating success from each of the plurality of physical FC target devices.

11. The method of claim 10 further comprising:
    returning an FCP_RSP to the FC initiator indicating failure in response to receipt of an FCP_RSP from any of the plurality of physical FC target devices that indicates failure.

12. Apparatus in a virtualized storage system, the storage system adapted to couple with a host system and adapted to couple with a plurality of storage devices, the storage system adapted to define a mirrored virtual volume comprising the plurality of storage devices, the apparatus comprising:
    a host interface adapted to exchange information with an attached host system;
    a back-end interface adapted to exchange information with the plurality of storage devices;
    a cache memory; and
    a virtual I/O processor coupled with the host interface and coupled with the back-end interface and coupled with the cache memory, the virtual I/O processor adapted to receive write commands from the host system and adapted to transmit write data associated with a received write command to the cache memory and to the plurality of storage devices, wherein the virtual I/O engine further comprises:
      a cut-through cache processor; and
      a forwarding processor, the cut-through cache processor adapted to receive a write command and associated write data from the host system and adapted to store the write data in the cache memory and adapted to transmit the write data to a first storage device of the plurality of storage devices as the write data is stored in the cache memory, and the forwarding processor adapted to transmit the write data from the cache memory to the other storage devices of the plurality of storage devices, wherein the forwarding processor is further adapted to transmit the write data from the cache memory to the other storage devices in response to successful completion of transmitting the write data to the first storage device.

13. The apparatus of claim 12 wherein the virtual I/O processor is adapted to transmit a response to the host system indicating success of the write command in response to successful completion of transmitting the write data to each of the plurality of storage devices.

14. The apparatus of claim 12 wherein the virtual I/O processor is adapted to transmit a response to the host system indicating failure of the write command in response to failure of transmitting the write data to any of the plurality of storage devices.

15. The apparatus of claim 12 wherein the host interface is a Fibre Channel (FC) interface and the host system is an FC initiator.

16. The apparatus of claim 12 wherein the back-end interface is a Fibre Channel (FC) interface and the plurality of storage devices is a plurality of physical FC target devices.

* * * * *